United States Patent [19]

Aoi et al.

[11] Patent Number: 4,719,395

[45] Date of Patent: Jan. 12, 1988

[54] VARIABLE SPEED CONTROL SWITCH FOR AN ELECTRIC TOOL INCLUDING A DC MOTOR

[75] Inventors: Tatsuo Aoi, Ibaragi; Haruo Atsumi, Shizuoka; Takeshi Kikukawa, Izumo; Kunio Nagata, Kyoto; Yasuhiro Kiyono, Nagaokakyo; Sueaki Honda, Kurayoshi, all of Japan

[73] Assignee: Omron Tateisi Electronics Co., Kyoto, Japan

[21] Appl. No.: 944,220

[22] Filed: Dec. 22, 1986

[51] Int. Cl.$^4$ .............................................. H02P 5/17
[52] U.S. Cl. ..................... 318/349; 318/346; 318/545; 318/549
[58] Field of Search ........... 318/305, 336, 339, 345 B, 318/345 F, 346, 347, 348, 349, 545, 549; 200/157, 164 R; 307/119, 125

[56] References Cited

U.S. PATENT DOCUMENTS

| 4,114,076 | 9/1978 | Teranishi et al. | 318/349 X |
| 4,218,730 | 8/1980 | Marumoto et al. | 318/345 B X |
| 4,465,958 | 8/1984 | Roberts | 318/347 |
| 4,506,198 | 3/1985 | Savas | 318/305 X |

*Primary Examiner*—Bentsu Ro
*Attorney, Agent, or Firm*—Wegner & Bretschneider

[57] ABSTRACT

A variable speed control switch for an electric tool including a DC motor having an armature circuit, includes: a device for turning off and on the armature circuit; an upper heat dissipation cover for covering the top of the turning off and on device; a lower heat dissipation cover for covering the bottom of the turning off and on device; a printed circuit board located at the lower surface of the lower cover for controlling motor speed; a resistor element is provided on the lower surface of the board; a movable contact assembly, including a first contact member for short circuiting the motor terminals, a second contact member for turning ON the power source, a third contact member for short circuiting the turning off and on device, and a brush for providing variable resistance by sliding over the resistor element; a device for biasing the movable contact assembly to the position of short-circuiting the motor terminals; a box like casing which receives the above-mentioned components, the power source terminals, the motor terminal, and provides a depending support portion; an operation lever, drivingly engaged to the movable contact assembly at its upper portion, provides the depending support portion of the casing at its lower pivoted portion, and being adapted to operatively rock about that pivoted portion. By this simple construction the number of parts of the control switch is minimized and the construction is compact, light and cheap.

6 Claims, 6 Drawing Figures

WAVE FORM DIAGRAM

RPM AND STROKE RELATIONSHIP DIAGRAM

VARIABLE SPEED CONTROL SWITCH FOR AN ELECTRIC TOOL INCLUDING A DC MOTOR

BACKGROUND OF THE INVENTION

The present invention relates to a variable speed control switch for an electric tool including a DC motor, and more particularly relates so such a variable speed control switch for an electric tool including a DC motor, which is light and compact and therefore permits compact and light construction of the electric tool as a whole.

The present inventors wish hereto to attract the attention of the examining authorities to copending patent application Ser. No. 944,221, which may be considered to be material to the examination of the present patent application.

In the prior art, there have been proposed various types of variable speed control switch for an electric tool including a DC motor. According to such a DC motor as for example utilized in such an electric tool which may be a hand held tool, the output torque rapidly increases as the load is increased and the rotational speed of the DC motor drops, and if the DC motor is continued to be operated in such a state there is a danger of an excessive torque output being produced and of the motor being burnt out. Therefore it has been conceived of to incorporate a torque limiter device into such a variable speed control switch for an electric tool including a DC motor, so as to drive the motor at a fixed torque or at a torque not higher than a determinate torque; but, since the torque must be adjusted for each different application and moreover the addition of such a torque limiter device increases the complexity and the bulk of the variable speed control switch and accordingly boosts the cost thereof, such a solution is by no means ideal. Further, prior art type DC motor variable speed control switches in general have tended to be complicated and/or bulky.

Typically, further, a variable speed control switch for an electric tool including a DC motor has included an ON/OFF switch for turning on and off the power source of the DC motor, a variable resistor for adjustably varying the resistance value of a speed varying control circuit, a brake switch for applying braking force to the motor when the motor is stopped by using the electromotive force generated by the inertia of the motor, and various other elements, and accordingly such a variable speed control switch for an electric tool including a DC motor has inevitably tended to be large and bulky and also heavy and complicated.

Further, typically such a variable speed control switch for an electric tool including a DC motor has been installed into the grip portion of said electric tool, and, by an operation lever of said electric switch which protrudes from the front surface of said grip portion of said electric tool being depressed by being squeezed by the hand of a user, the contacts of the switch mechanism are switched over so that the DC motor of said electric tool is switched ON and OFF and further the operating speed of said DC motor is varied. However, since the motion of such a conventional type of operating lever is a sliding motion which controls the internal mechanism of the switch by way of a back and forth motion, the effective stroke is no more than the actual depression amount provided by the hand of the user, and accordingly said effective stroke is necessarily rather short. On the other hand, if the effective stroke is made to be so long as is convenient for manufuacturing the switching mechanism, the operation stroke of the switching mechanism is increased so much, and the operation lever protrudes so much from the front surface of the grip of the electric tool, that the usability of said electric tool is severly deteriorated.

Further, with such a slide type operating lever, the problem arises of the entry of dust or dirt or foreign matter into the interior of the switching mechanism. Since the electric tool is typically used for working by processing various materials by grinding them, drilling them, or cutting them, large quantities of such foreign matter such as cuttings, chips, or swarf or the like are nearly inevitably produced in the neighborhood of said switch mechanism of said electric tool, and further since such foreign matter is likely to be of metallic type, the entry thereof into the interior of said switch mechanism can give rise to troublesome problems and in the worst case can totally ruin the operation of said switching mechanism. Accordingly, there is a requirement for extremely effective sealing of such a switching mechanism against external particles or dirt or dust or moisture or the like.

Further, such a variable speed control switch for an electric tool including a DC motor typically includes a variable resistor for the purpose of speed control of said DC motor. However, in a conventional such variable speed control switch, since such a variable resistor is typically provided separately with the electric tool in association with the adjustment and operation unit, not only is the interior space within the electric tool utilized in an inefficient manner, but also the wiring between the variable resistor and a typical printed circuit board within the electric tool tends to become complicated, and as a result this in turn causes inefficiency in the assembly work for the electric tool and attendant increase in production and manufacturing cost.

Yet further, a switching element (such as a power transistor) incorporated in such a variable speed control switch for an electric tool including a DC motor typically tends to generate substantial heat due to its basic structure, and therefore various measures have conventionally been taken for controlling the heat generated by such a switching element such as a power transistor. However, the effectiveness of heat control has not always been optimum, and there have always heretofore been the problems of impaired performance and reduced service life of the switching mechanism due to deterioration thereof caused by the evolved heat.

Yet further, typically such a power transistor to be associated with such a variable speed control switch for an electric tool including a DC motor has its terminals connected to such a printed circuit board, and then subsequently the printed circuit board is connected to the terminals of the switching mechanism, thus connecting the power transistor to the switching mechanism via the printed circuit board.

However, since a relatively large electrical current typically flows through the power transistor and therefore through the printed cicuit board, the output end of the pattern printed on said printed circuit board is inevitably required to be relatively large and thick, and the size of the printed circuit board must undesirably be increased accordingly. And, furthermore, electrically connecting the terminals of such a power transistor or the like and also the terminals of the switching mechanism to the printed circuit board tends to be cumbersome, and the efficiency with which the work can be performed tends to be low, because of the requirement for making connections within the switch casing. Even yet furthermore, these circumstances may contribute to insufficient mechanical strength of such connections, and may cause said connections to fail when subjected to vibration or the like as is inevitable during the use of such an electric tool.

SUMMARY OF THE INVENTION

Accordingly, it is the primary object of the present invention to provide a variable speed control switch for an electric tool including a DC motor, which is well applicable to use in a hand held electric tool.

It is a further object of the present invention to provide such a variable speed control switch for an electric tool including a DC motor, which is easy to control.

It is a further object of the present invention to provide such a variable speed control switch for an electric tool including a DC motor, which can control the speed of the DC motor in proportion to the stroke of an operating lever as set by the hand of the operator.

It is a further object of the present invention to provide such a variable speed control switch for an electric tool including a DC motor, which allows the output torque of the DC motor to be easily varied.

It is a further object of the present invention to provide such a variable speed control switch for an electric tool including a DC motor, which has a simple structure.

It is a further object of the present invention to provide such a variable speed control switch for an electric tool including a DC motor, which is easy to assemble.

It is a further object of the present invention to provide such a variable speed control switch for an electric tool including a DC motor, which has a reduced number of component parts.

It is a yet further object of the present invention to provide such a variable speed control switch for an electric tool including a DC motor, which minimizes cost of components.

It is a yet further object of the present invention to provide such a variable speed control switch for an electric tool including a DC motor, which minimizes cost of assembly.

It is a yet further object of the present invention to provide such a compact variable speed control switch for an electric tool including a DC motor.

It is a yet further object of the present invention to provide such a variable speed control switch for an electric tool including a DC motor, which allows of compact design and construction of the electric tool.

It is a yet further object of the present invention to provide such a variable speed control switch for an electric tool including a DC motor, which is light in weight.

It is a yet further object of the present invention to provide such a variable speed control switch for an electric tool including a DC motor, which has an effectively long switch member stroke, without making the stroke required for an operation lever thereof undesirably long.

It is a yet further object of the present invention to provide such a variable speed control switch for an electric tool including a DC motor, which keeps tool usability high.

It is a yet further object of the preset invention to provide such a variable speed control switch for an electric tool including a DC motor, which can obtain a desired power source irrespective of the rotational direction of the motor.

It is a yet further object of the present invention to provide such a variable speed control switch for an electric tool including a DC motor, which provides easy motor rotational direction reversion.

It is a yet further object of the present invention to provide such a variable speed control switch for an electric tool including a DC motor, which is well sealed against the ingress of foreign matter such as dust, dirt, or moisture.

It is a yet further object of the present invention to provide such a variable speed control switch for an electric tool including a DC motor, which is provided with a heat dissipation cover for protection of a switching element thereof against damage caused by temperature rise due to heat generation thereby.

It is a yet further object of the present invention to provide such a variable speed control switch for an electric tool including a DC motor, which has a good arrangement for providing wiring for such a switching element thereof, without increasing the size of any printed circuit board thereof and without deteriorating assembly efficiency.

According to the most general aspect of the present invention, these and other objects are attained by a variable speed control switch for an electric tool including a DC motor comprising an armature circuit, comprising: a means for turning on and off said armature circuit of said DC motor; an upper heat dissipation cover which covers a top surface of said turning off and on means; a lower heat dissipation cover which covers a bottom surface of said turning off and on means; a printed circuit board located on a lower surface of said lower heat dissipation cover and carrying a control circuit imprinted on it; a resistor element provided on a lower surface of said printed circuit board and constituting a part of a speed variation control circuit for said DC motor; a movable contact assembly, comprising a first contact member for short circuiting terminals of said DC motor, a second contact member for turning ON a power source, a third contact member for short circuitry said turning off and on means, and a brush for varying a resistive value for sliding over said resistor element; a means for biasing the slide position of said movable contact assembly to a position thereof which short circuits and first contact member; a box like casing which receives the above mentioned components into its upper side opening, which receives on one of its sides power source terminals and a motor terminal, and which is provided on its lower side with a depending support portion; and: an operation lever which is drivingly engaged to said movable contact assembly at an upper portion thereof and which is pivoted to said depending support portion of said casing at a lower pivoted portion thereof, thereby being adapted to operatively rock about its said pivoted portion.

According to such a variable speed control switch for an electric tool including a DC motor as specified above, since said first through said third contact members are appropriately short circuited by the sliding motion of the movable contact assembly based upon the amount of depression of the operation lever, so as to turn the power source ON and OFF while the resistive value of the resistor element is varied by the sliding of the brush over it, thus controlling the operation of the speed variation control circuit for the DC motor, thereby said DC motor can be adjusted to any desired torque output by the operator merely actuating the single operation lever which is easy to perform. Therefore, the control of the torque of the hand electric tool to which this control circuit is fitted is thereby simplified and made easy, and the usability of said elctric tool is kept high. Additionally, since the various component parts are installed into the opening of the box like casing, the volume of this variable speed control switch is minimized, and reduction of the size of the switch is facilitated; also, easy adjustment of the torque of the DC motor is also made available at the same time. Further, because the lower end of the operation lever is pivoted to said depending support portion of said casing at a lower pivoted portion thereof while the upper end of said operation lever is drivingly engaged to said movable contact assembly at an upper portion thereof, the stroke imparted to said operation lever at the hand of the user is magnified by the rocking action thereof, thus causing the movement of the movable contact assembly to be sufficient and appropriate for performing its switching action without requiring the movement imparted by the hand of the user to the operation lever to be unduly great.

And, according to a particular specialization of the present invention, the above and other objects may more particularly be accomplished by such a variable speed control switch for an electric tool including a DC motor as specified above, wherein said movable contact assembly is formed with two mutually parallel ridges aligned along its direction of motion, and said second contact member and said third contact member are generally formed in letter "U" shapes and are fitted one over each of said two ridges; said first contact member being fitted into a hole formed in an otherwise unused space at end portions of said two ridges generally perpendicular to said two ridges.

According to such a construction, since the various operational component parts such as the first through the third contact members and the brush are arranged in the casing in a rational and logical manner, the overall structure of this switch is made extremely compact, and the space requirement for installing this switch into the electric tool is made easier, with the result that even more compact design for the electric tool is made possible.

According to another particular specialization of the present invention, the above and other objects may more particularly be accomplished by such a variable speed control switch for an electric tool including a DC motor as specified above, further comprising a sealing cover fitted over said operation lever between it and said casing and permitting the motion of said operation lever with respect to said casing while providing a seal therebetween.

According to such a construction, since the sealing cover is fitted over the gap between the opening of said casing which receives the end of said operation lever which drives the movable contact assembly and said end of said operation lever, the opening is always kept in the sealed state, and no dust or moisture or the like can effectively enter into the inside of the control switch. Thus, the stable, reliable, and good contacting performance of this variable speed control switch can be assured, and its service life is extended.

According to another particular specialization of the present invention, the above and other objects may more particularly be accomplished by such a variable speed control switch for an electric tool including a DC motor as specified above, wherein said resistor element is integrally provided with said printed circuit board.

According to such a construction, since the printed circuit board and the resistor element are integrally provided and are combined, the mounting space within the electric tool can be effectively utilized, and further as a result the assembly work is simplified, the wiring is simplified, and therefore the manufacturing cost is reduced. Additionally, parts management and handling and spare parts stocking problems are reduced.

According to another particular specialization of the present invention, the above and other objects may more particularly be accomplished by such a variable speed control switch for an electric tool including a DC motor as specified above, wherein said upper heat dissipation cover and said lower heat dissipation cover tightly receive said turning off and on means between them, and further said upper heat dissipation cover and said lower heat dissipation cover are both formed with portions extending perpendicularly to their main portions around the sides of said turning off and on means.

According to such a construction, the conduction of evolved heat away from said turning on and off means is facilitated by the close contact of said upper heat dissipation cover and said lower heat dissipation cover to it; and further the subsequent dissipation of said evolved heat is aided by the provision of the perpendicularly extending portions of said upper heat dissipation cover and said lower heat dissipation cover, which act as heat radiators for efficiently dissipating heat. Therefore, the turning on and off means is not over heated, and its service life is desirably extended. Further, the upper heat dissipation cover and said lower heat dissipation cover are also effective for preventing the ingress of dust, dirt, moisture, or other contaminants into the interior of the switch.

Finally, according to yet another particular specialization of the present invention, the above and other objects may more particularly be accomplished by such a variable speed control switch for an electric tool including a DC motor as specified above, wherein at least one terminal of said turning off and on means and at least one said contact member are connected together externally of said casing.

According to such a construction, since the terminal or terminals of the turning off and on means and at least one said contact member and preferably several thereof are connected together externally of said casing, no large output end pattern for the circuit on the printed circuit board is required for control of the DC motor, and the size of said printed circuit board can accordingly be reduced. Further, because the work of establishing the connections is facilitated, and the lengths of the terminal wires of the turning on and off means are reduced, the efficiency of assembly of this switch can be improved, and thereby the cost as a whole can be reduced. Further, high mechanical strength is also made more easily available, so that the final product is more proof against vibration and the like.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts in the various figures; and:

DESCRIPTION OF THE PREFERRED EMBODIMENT

Figure 1:
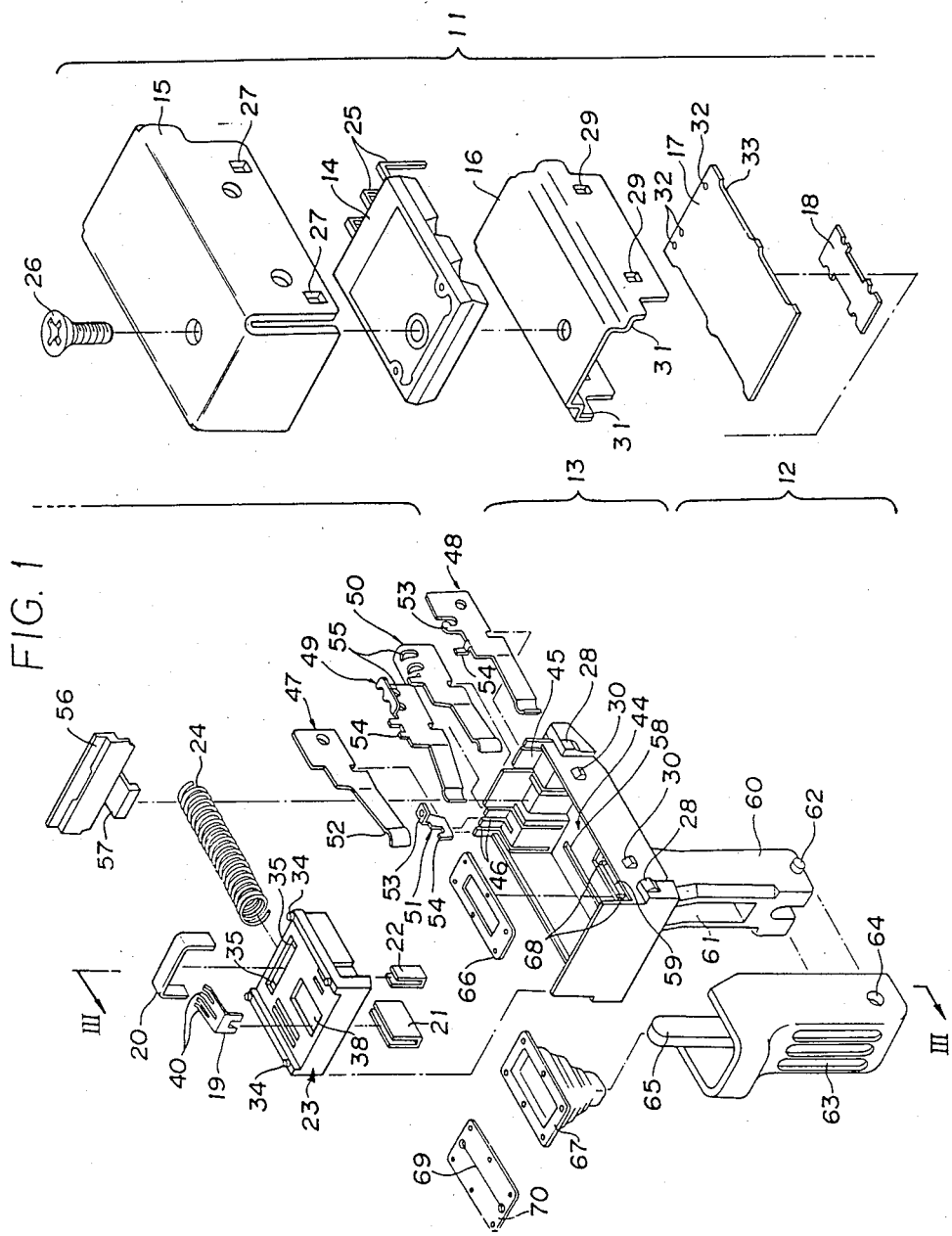
FIG. 1 is an exploded view of the preferred embodiment of the variable speed control switch for an electric tool including a DC motor of the present invention.
Figure 2:
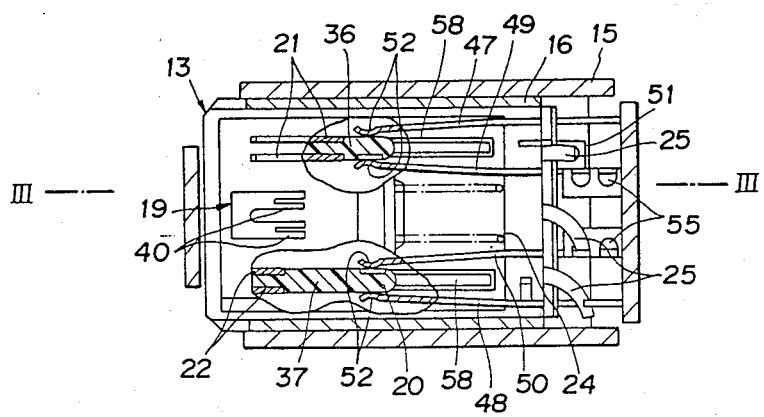
FIG. 2 is a bottom view of a switch case of the preferred embodiment control switch shown in FIG. 1.
Figure 3:
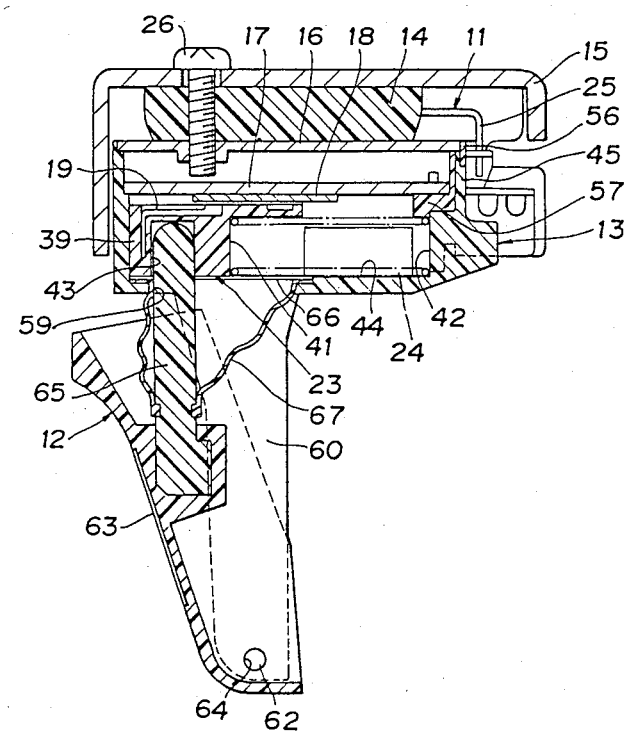
FIG. 3 is a partial vertical cross sectional view of said FIG. 1 preferred embodiment control switch, taken in a plane shown by the arrows III—III in FIGS. 1 and 2.
Figure 4:
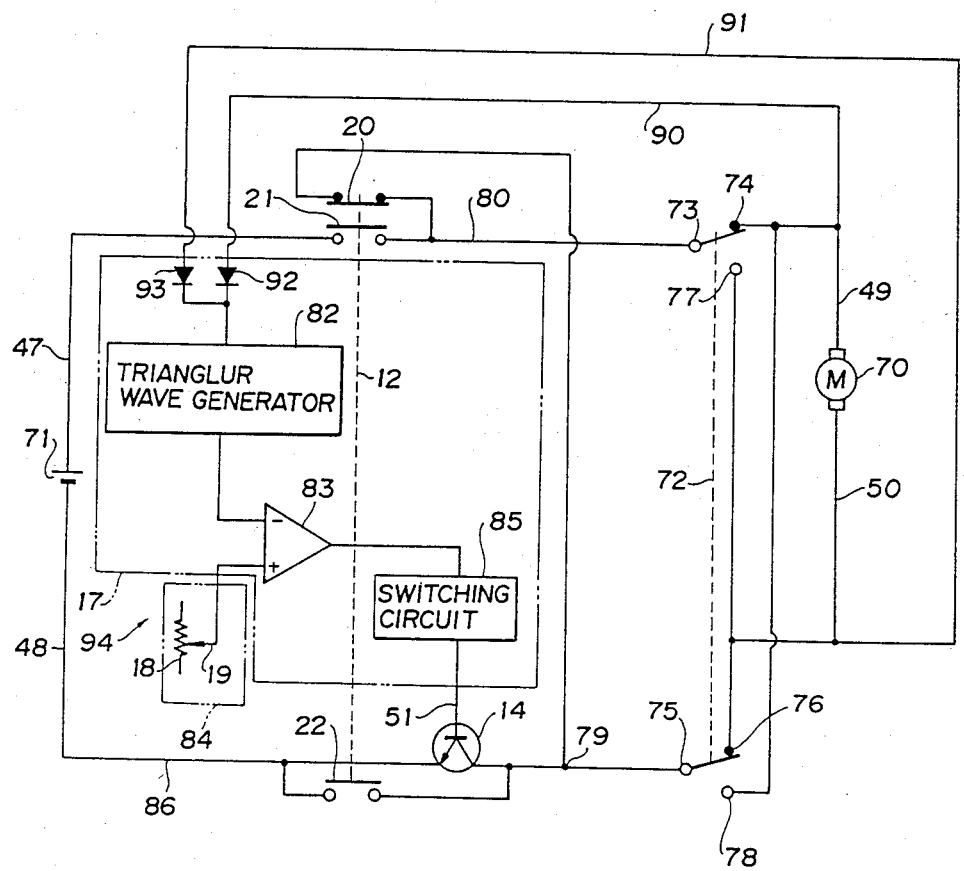
FIG. 4 is a circuit diagram of a control circuit suitable to be controlled by this preferred embodiment of the present invention.

In FIGS. 1 through 3 there are shown various views of the mechanical construction of the preferred embodiment of the variable speed control switch for an electric tool including a DC motor of the present invention, which is a control switch for controlling a motor 70 (shown as a block in FIG. 4 only) of a DC electric tool, such as a DC type power screwdriver or power drill or the like which is adapted to be held in the hand of a user. Further, FIG. 4 shows a circuit diagram of a control circuit for a DC motor suitable to be controlled by said preferred embodiment control switch of the present invention, while FIGS. 5 and 6 relate to explanations of the performance thereof.

Control Switch Mechanical Construction

FIG. 1 shows this preferred embodiment control switch in exploded perspective view: said control switch comprises a control unit 11 for said DC motor 70, an operation lever 12 for operating the motor 70 via said control unit 11, and a switch case 13 which houses said units in its interior. This control switch assembly is typically installed into the grip of the aforesaid electric tool such as for instance a power screwdriver or power drill.

Referring first to the control unit 11, it comprises a power transistor 14, an upper heat dissipation cover 15 which covers the upper side of said power transistor 14, a lower heat dissipation cover 16 which covers the lower side of said power transistor 14, a printed circuit board 17 which is imprinted with a control circuit which will be described hereinafter, a resistor board 18 which constitutes a part of a variable reference voltage generator, a brush 19 which is maintained in sliding contact with said resistor board 18 as will be described shortly, an insulated movable contact member housing 23 which houses a first movable contact member 20, a second movable contact member 21, a third movable contact member 22, and a return spring 24 for said movable contact member housing 23.

The power transistor 14 is generally rectangular in shape, and it controls the flow of DC electrical current through the armature circuit of the DC motor 70 by ON/OFF control as will be described later from its three terminals 25, which project from one of its end faces and which are bent downwards and are connected to first and second power source terminal members 47 and 48 and to first and second motor terminal members 49 and 50. Since such a power transistor generally evolves a substantial amount of heat, the power transistor 14 is interposed between the upper heat dissipation cover 15 and the lower heat dissipation cover 16 which are made of metal of relatively high thermal conductivity, so that the heat thus evolved by said power transistor 14 is absorbed and transmitted to the environment via said upper and lower heat dissipation covers 15 and 16. In more detail, the power transistor 14 has an upper surface which is fitted to the lower surface as seen in the figure of the upper heat dissipation cover 15 which itself is formed in an incomplete hollow box shape with its open face presented in the downwards direction as seen in the figure, and further said power transistor 14 has a lower surface which is fitted to the upper surface as seen in the figure of the lower heat dissipation cover 16 which itself is formed in a shape with a letter "U" shaped cross section with the open side of said "U" shape presented in the downwards direction as seen in the figure; and a bolt 26, which is passed through holes in said upper heat dissipation cover 15, said power transistor 14, and said lower heat dissipation cover 16 in order and is then screwed into a hole in some member not particularly shown, clamps said power transistor 14 and said upper and lower heat dissipation covers 15 and 16 together, so that the heat evolved by the power transistor 14 can be easily and quickly transferred to said upper and lower heat dissipation covers 15 and 16 and carried away to the outside. Thereby the power transistor 14 is kept at an acceptable level of coolness during operation.

In more constructional detail, the open hollow box shaped upper heat dissipation cover 15 is integrally fitted over the switch case 13, receiving in order the power transistor 14 and the lower heat dissipation cover 16 inside itself, with rectangular engagement holes 27 which are formed in the sides of said upper heat dissipation cover 15 being engaged with engagement projections 28 formed on the side surfaces of the switch case 13 as will be described later. And the lower heat dissipation cover 16 is likewise provided with rectangular engagement holes 29 which are formed in its sides, and these rectangular engagement holes 29 are engaged with other engagement projections 30 also formed on the side surfaces of the switch case 13 as will similarly be described later. Further, step portions 31 formed as shoulders on the side walls of this lower heat dissipation cover 16, where said side walls meet the main body thereof, serve for holding down and retaining the printed circuit board 17 as will also be described hereinafter.

According to this construction, because the switching element, i.e. the power transistor 14, is closely interposed between the upper heat dissipation cover 15 and the lower heat dissipation cover 16, both from above and below, the heat generated by said power transistor 14 is efficiently absorbed by said upper heat dissipation cover 15 and said lower heat dissipation cover 16 which are made of a material such as aluminum alloy which has a realtively high thermal conductivity, and hence said power transistor 14 is kept relatively cool and is prevented from overheating, and accordingly high performance and stable action thereof can be expected, and indeed assured, at all times. Since the upper heat dissipation cover 15 and the lower heat dissipation cover 16 are provided with vertically extending (in FIG. 1) portions in addition to their base portions, the efficiency of heat dissipation provided by them, both from their horizontal surfaces and from their vertical surfaces, is yet further enhanced. Yet further, since the upper heat dissipation cover 15 completely covers the power transistor 14 by receiving said power transistor 14 in is interior cavity, intrusion of dust or dirt or the like into the interior of this switching construction at this portion of the construction is thereby positively prevented.

The printed circuit board 17 is securely held against the upper side as seen in the figure of the switch case 13 by its side edges being held against the upper side edges of said switch case 13 by the pressure of the step portions 31 of the lower heat dissipation cover 16. Terminal connection holes 32 are provided along one end edge of said printed circuit board 17, and these terminal connection holes 32 are connected to the first and second power source terminal members 47 and 48 and the first and second motor terminal members 49 and 50 which will be described hereinafter. Slide guide depressions 33 are cut out along the side edges of the printed circuit board 17, and upper slide projections 34 of the insulated movable contact member housing 23 which will be described in detail hereinafter are guided by these slide guide depressions 33 for the purpose of restricting the sideways shifting of said insulated movable contact member housing 23 during its sliding motion, as well as for the purpose of restricting the vertical shifting of said insulated movable contact member housing 23 by the lower surface of the printed circuit board 17 contacting against said insulated movable contact member housing 23. And over the lower surface of said printed circuit board 17 there is bonded a thin resistor board 18, on which resistive elements for generating a variable reference voltage for the motor 70, as will be described hereinafter, are printed.

Since the thin resistor board 18 is integrally combined with the printed circuit board 17 as for instance by bonding, said thin rsistor board 18 is installed at the same time as the printed circuit board 17 is installed into its determined location, and accordingly both efficiency in the utilization of space and assembly efficiency are enhanced. Further, handling of the assembly is simplified, because the thin resistor board 18 is bonded to the lower surface in FIG. 1 of the printed circuit board 17.

The insulated movable contact member housing 23 is shaped as a block member which is received in the switch case 13. A letter "C" shaped first movable contact member 20 is press fitted from above in the figure by its legs into a pair of press fitting holes 35 provided in the rear part of the upper surface of the insulated movable contact member housing 23; a letter "U" shaped broader second movable contact member 21 is press fitted from below in the figure over and around a one 36 of a pair of fitting walls 36 and 37 (vide FIG. 2) which both project downwards from the lower surface in FIG. 1 of the insulated movable contact member housing 23 and are mutually parallel; and a letter "U" shaped narrower third movable contact member 22 is press fitted from below in the figure over and around the other ones 37 of said pair of fitting walls (also vide FIG. 2). The press fitting holes 35 are provided in an unused space adjacent to the right hand end portions as seen in FIG. 2 of the fitting walls 36 and 37 which receive the legs of the first movable contact member 20 as mentioned above. A letter "L" shaped brush 19 is fitted by its base end portion, by way of a brush receiving opening 38, into an internal brush receiving groove 39 (vide FIG. 3) formed in the front part of the upper surface of the insulated movable contact member housing 23, in such a manner that a pair of brush contact portions 40 defined by the bifurcated free end of said brush 19 are pressed onto the lower surface of the thin resistor board 18 of the printed circuit board 17 with a certain upward biasing force exerted by the resilience of the brush 19, so that thereby the torque of the motor 70 can be varied as the brush 19 is slid along the thin resistor board 18 along with the insulated movable contact member housing 23 and the resistive value thus provided by the thin resistor board 18 for setting said motor output torque is varied. And the return spring 24 biases the insulated movable contact member housing 23 along with the brush 19 thus affixed to it in the leftwards direction as seen in FIG. 1, thus to cause the maximum resistive value capable of being provided in the above connection by the thin resistor board 18 in fact to be provided.

On the upper face in FIG. 1 of the insulated movable contact member housing 23, at the four corners thereof, are provided upwardly projecting slide projection pins 34, which are engaged with the previously mentioned slide guide depressions 33 formed on the sides of the printed circuit board 17 so as to guide the motion of the insulated movable contact member housing 23 to and fro and stop it slewing around. A spring receiving hole 41 (vide FIG. 3) is formed in one end surface of the insulated movable contact member housing 23 for receiving the end of the return spring 24, and the other end of said return spring 24 is received by another spring receiving hole 42 (vide FIG. 3 again) which is formed in one end surface of the switch case 13, so as to maintain said return spring 24 in place in compressed form so as to bias the insulated movable contact member housing 23 as explained above. And the other end of the lower surface as seen in FIG. 1 of said insulated movable contact member housing 23 is formed with an operation stem portion receiving hole 43 for receiving an operation stem portion 65 of the operation lever 12 which will be described hereinafter, so as to move the insulated movable contact member housing 23 to and fro by the action of said operation stem portion 65 of said operation lever 12 by said operation lever 12 being squeezed by the hand of the operator like a trigger.

The switch case 13 is shaped like a box with an open top side as seen in FIG. 1, and the insulated movable contact member housing 23 is received inside the upper surface opening 44 of said switch case 13 so as to be slidable along its fore and aft direction. The printed circuit board 17 along with the upper heat dissipation cover 15 and the lower heat dissipation cover 16 are securely positioned over the insulated movable contact member housing 23 with the rectangular engagement holes 27 of the upper heat dissipation cover 15 and the rectangular engagement holes 29 of the lower heat dissipation cover 16 being, respectively, engaged over the engagement projections 28 and the engagement projections 30 of the side surfaces of the switch case 13. In the rear end wall 45 of the upper surface opening 44 of this switch case 13 there are formed a plurality of slots 46 (actually, five) for fitting terminals thereinto, and the two outermost ones of said slots 46 receive the first power source terminal member 47 and the second power source terminal member 48, while the three innermost ones of said slots 46 receive the first motor terminal member 49, the second motor terminal member 50, and a circuit connection terminal member 51 for connection with the base of the power transistor 14. Thus, the first power source terminal member 47 and the first motor terminal member 49 confront one another as a pair, and similarly the second power source terminal member 48 and the second motor terminal member 50 confront one another as another pair. And the previously mentioned mutually parallel fitting walls 36 and 37 which project downwards from the lower surface in FIG. 1 of the insulated movable contact member housing 23 with the second movable contact member 21 and the third movable contact member 22 fitted on them respectively are respectively sandwiched between the end portions 52 of the first power source terminal member 47 and the first motor terminal member 49, and the end portions 52 of the second power source terminal member 48 and the second motor terminal member 50, and thereby the first motor terminal member 49 and the second motor terminal member 50 are kept normally in contact with the first movable contact member 20, and as the insulated movable contact member housing 23 is displaced they further come into contact with the second movable contact member 21 and then the third movable contact member 22 in a sequential manner.

On the outwardly projecting ends of these various terminals 47 through 51 there are formed holes 53 for receiving the terminals of the power transistor 14, projections 54 for connection with the printed circuit board 17, and holes 55 for the connection of various lead wires thereto, as particularly required. The transistor terminals 25 are directly soldered to the transistor terminal receiving holes 53. Since these connections are made outside of the main body of the switch case 13, the work of soldering is thereby facilitated, and the resulting connections are more reliable and more proof against vibration or the like. The projection 54 for connection with the printed circuit board 17 is fitted into the terminal connection hole 32 of the printed circuit board 17 and then is soldered thereto.

The first power source terminal member 47 and the second power source terminal member 48 are connected to the terminals of a battery 71 (vide FIG. 4) which serves as a DC power source by way of lead wires, while the first motor terminal member 49 and the second motor terminal member 50 are connected to a reverse switch 72 (also vide FIG. 4) for reversing the rotational direction of the motor 70 as desired. The circuit connection terminal member 51 directly connects the base terminal 25 of the power transistor 14 to the control circuit formed on the printed circuit board 17.

A spacer member 56 is provided for pressing against the upper edges of the terminals 47 through 51. This spacer member 56 is securely fitted into the upper middle portion of the rear end wall 45 of the switch case 13, and the upper edge of said spacer member 56 is pressed downwards in FIG. 1 by the lower surface of the lower heat dissipation cover 16, so that the lower edge of said spacer member 56 prevents the terminals 47 through 51 from coming out from their respective ones of the slots 46 into which they are fitted by pressing upon them. Further, a depending portion 57 which projects from the lower portion of the spacer member 56 serves the function of providing part of the spring receiving hole 42 provided as explained above on the rear portion of the switch case 13. This spacer member 56 also provides an anti dust action by sealing the rear end of the switch case 13 in an efficient manner.

A pair of elongated grooves 58 are provided on either side of the bottom surface of the switch case 13 for further guiding the sliding motion of the insulated movable contact member housing 23, and a slit 59 facing towards the front as seen in FIG. 1 is formed through the central part of said bottom surface of the switch case 13 for passing the operation stem portion 65 of the operation lever 12, mentioned above.

A support portion 60 depends from the lower surface in FIG. 1 of the switch case 13, and said support portion 60 is formed with a communication slot 61 which extends in the fore and aft direction with regard to the direction of motion of the insulated movable contact member housing 23 and which communicates with the above mentioned slit 59 for passing the operation stem portion 65, and the lower side surfaces of said support portion 60 are each provided with a pivot pin 62 for rotatably supporting the operation lever 12.

This operation lever 12 is formed with a generally semi circular cross section, and the outer side of said circular cross sectional shape constitutes the operating surface 63 for being squeezed by the hand of the operator. Pivot holes 64 are formed at the bottom portion in FIG. 1 of the operation lever 12, and serve for being fitted over the pivot pins 62 for pivotally mounting the operation lever 12 so that said operation lever 12 can be rocked back and forth about its lower portion, thus shifting the upper end of the operation stem portion 65 to and fro along the slit 59 in the fore and aft direction with regard to the direction of motion of the insulated movable contact member housing 23 and thus moving said movable contact member housing 23 to and fro by the engagement of the upper tip portion of said operation stem portion 65 in the operation stem portion receiving hole 43 of said movable contact member housing 23.

A first seal rubber member 66 is provided around the slit 59 on the side thereof inside of the switch case 13 and is flat rectangular annular in shape, and a second seal rubber member 67 which is tubular rectangular in shape and is formed with a projecting bellows portion is provided as applied against said first seal rubber member 66 with its bellows portion extending downwards in the figure with its lower end being secured around a lower portion of the operation stem portion 65; a number of pins 68 are provided on the switch case 13 and are cold clamped through fitting holes provided through said first seal rubber member 66 and said second seal rubber member 67, so as securely to clamp said first seal rubber member 66 and said 67 to said switch case 13 so as to present the intrusion of dust, dirt, or the like from the outside through the slit 59 into said switch case 13. This is particularly important because the electric tool to which this switch construction is fitted could likely create large quantities of dust or chips or shavings or swarf or the like, and the presence of the first and second seal rubber members 66 and 67 ensures that such foreign bodies or matter definitely are prevented from undesirably penetrating to the interior of the switch construction, which might otherwise severely deteriorate the performance of said switch construction and of the electric tool as a whole. Thereby, the performance of said electric tool is enhanced through reliable and stable operation of the switch construction thereof.

Optionally, a third seal rubber member 70, formed with a slot 69 therein, can be utilized in the construction, either instead of or additionally to the second seal rubber member 67. In such a case, the operation stem portion 65 of the operation lever 12 is passed through the slot 69, and is embraced by the two sides of said slot 69, accordingly being provided with a similar sealing effect to the one described above.

Control Switch Mechanical Operation

This switch for the DC motor 70 is installed into the grip, not particularly shown, of an electric tool (not shown either), and the operation lever 12 thereof protrudes in the forward direction thereof from the front surface thereof in an inclined orientation, so as when squeezed by the hand of a user of the tool to be pivoted about the pivot holes 64 which rotate on the pivot pin 62 and so as thus via the operation stem portion 65 to push the insulated movable contact member housing 23, against the biasing force of the return spring 24 which is overcome, in the rightward direction as seen in FIGS. 1 through 3, i.e. the so called rearward direction. During this sliding motion, the end portions 52 of the first motor terminal member 49 and of the second motor terminal member 50 are displaced away from the first movable contact member 20 and do not contact with said first movable contact member 20, while the first power source terminal member 47 and the first motor terminal member 49 come to be in contact (the ON state) with the second movable contact member 21. As a result, the power source is turned ON and the motor 70 is activated.

In this situation, the torque of the motor 70 is variably adjusted as required by adjusting the stroke of the insulated movable contact member housing 23 by the operator suitably positioning the operation lever 12 by applying appropriate gripping and squeezing pressure, thus appropriately positioning the brush 19 on the thin resistor board 18 which are intervened in the circuitry for speed control including the power transistor 14. When the operation lever 12 is fully squeezed so as to be positioned to its exteme clockwise position from the point of view of FIG. 3 against the biasing action of the return spring 24 which is overcome, the insulated movable contact member housing 23 is thereby slid to its extreme position rightwards as seen in that figure, thus causing the second power source terminal member 48 and the second motor terminal member 50 to be brought into contact (the ON state) with the third movable contact member 22. As a result, the collector and the emitter of the power transistor 14 in the final stage of the speed control circuit are short circuited, and the torque of the motor 70 is maximized. On the other hand, when the operation lever 12 is fully released so as to be positioned to its extreme anti clockwise position from the point of view of FIG. 3 under the biasing action of the return spring 24, the insulated movable contact member housing 23 is thereby slid to its extreme position leftwards as seen in that figure, thus causing the first power source terminal member 47 and the second power source terminal member 48 to be brought out of contact (the OFF state) with the second movable contact member 21 and the third movable contact member 22. As a result, the power source is turned OFF, and simultaneously the first motor terminal member 49 and the second motor terminal member 50 contact the original first movable contact member 20, and this contact contributes to the braking action of the counter electromotive force of the motor 70 which continues to turn by the virtue of its inertia even after the power source is turned OFF. This braking action is favorable for improving the usability of this electric tool.

It will be understood that, by the pivoting or rocking action of the operation lever 12 as it is thus squeezed and released, the stroke provided by the hand of the operator is magnified; in other words, the stroke of the operation stem portion 65 of said operation lever 12 is considerably greater than the operator's hand stroke, due to the greater distance between said operation stem portion 65 and the pivot pins 62 than between the operating surface 63 and said pivot pins 62. Therefore, without the grip portion of the operation lever 12 being required at any time to protude excessively from the handle of the electric tool, the switch construction as shown above can nevertheless be provided with a suitable and appropriate length of travel or stroke. This is a notable advantage of the present shown construction.

Circuit Controlled by this Preferred Embodiment Switch

FIG. 4 shows a circuit diagram of a control circuit for a DC motor suitable for being controlled by this preferred embodiment of the variable speed control switch for an electric tool including a DC motor of the present invention. In this circuit, in the exemplary foward operation position of the previously mentioned reverse switch 72 schematically shown in the figure, one side of the motor 70 is connected to the positive pole of the battery 71 via the first power source terminal member 47, the second movable contact member 21, the contact pieces 73 and 74 of said reverse switch 72 which are switchingly connected together, and the first motor terminal member 49; while the other negative pole of the battery 71 is connected to the other side of the motor 70 via the second power source terminal member 48, the emitter and the collector of the power transistor 14, the contacts 75 and 76 of the reverse switch 72 which are switchingly connected together, and the second motor terminal member 50. On the other hand, the contacts 77 and 78 of the reverse switch 72 are not switchingly connected to any other contacts at this time. Further, the junction 79 between the collector of the power transistor 14 and the contact 75 of the reverse switch 72 is connected to the primary end of the first movable contact member 20, while the secondary end of said first movable contact member 20 is connected to a line 80. The third movable contact member 22 is arranged between the collector and the emitter of the power transistor 14 so as to be able to short circuit them together for the purpose of eliminating any loss during full speed rotation of the motor 70 which might otherwise occur due to the internal resistance of the power transistor 14.

Figure 5:
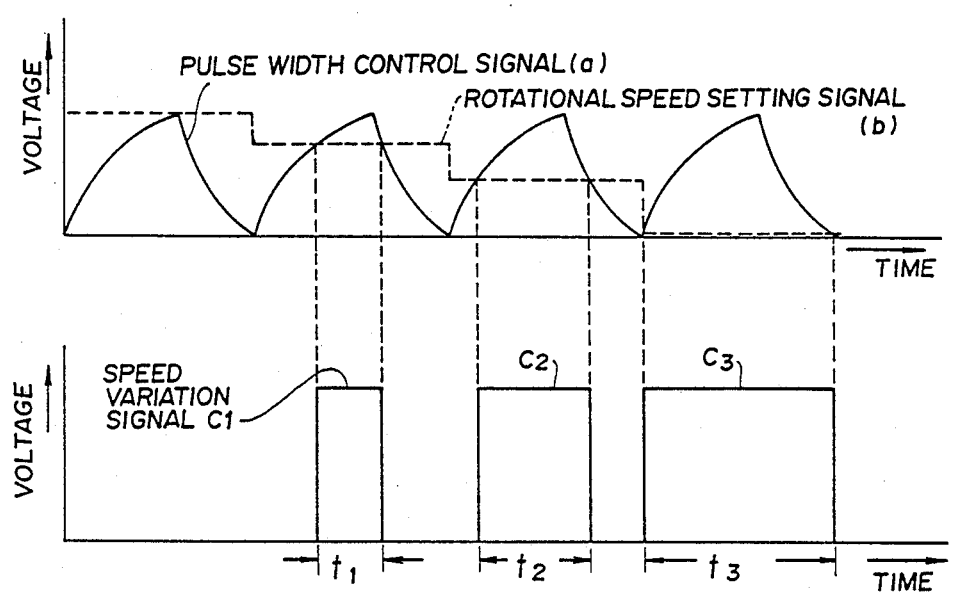
FIG. 5 is a wave form diagram showing various wave forms present in said FIG. 4 control circuit.

The output of a triangular wave generator 82 is supplied via respective diodes 92 and 93 and via respective lines 90 and 91 to the two ends of the rotor of the motor 70, and a pulse width control signal as shown by "a" in FIG. 5 is produced by this triangular wave generator 82. In other words, this triangular wave generator 82 consists of an oscillator which comprises various resistors, capacitors, amplifiers and the like, as is per se known in the art, and can produce, in addition to the pulse wave signal as shown in FIG. 5, various asymmetric triangular wave forms of various types by varying a CR time constant. The output of this triangular wave generator 82 is supplied to one of the terminals of a comparator 83, while the other input terminal of said comparator 83 is connected to a variable reference signal generator 84 which is provided with the thin resistor board 18 and the brush 19 as mentioned earlier.

This variable reference signal generator 84 is a circuit for producing a voltage which is proportional to the operational stroke of the operation lever 12, as can be readily understood by one of ordinary skill in the relevant art from the above explanations. In other words, as shown by the broken line in FIG. 5, the variable reference signal generator 84 produces a high voltage when the stroke of the operation lever 12 is zero, and a low voltage when said stroke of said operation lever 12 is small, in proportion to said stroke of said operation lever 12, to generate the rotational speed setting signal denoted as "b" in FIG. 5.

Figure 6:
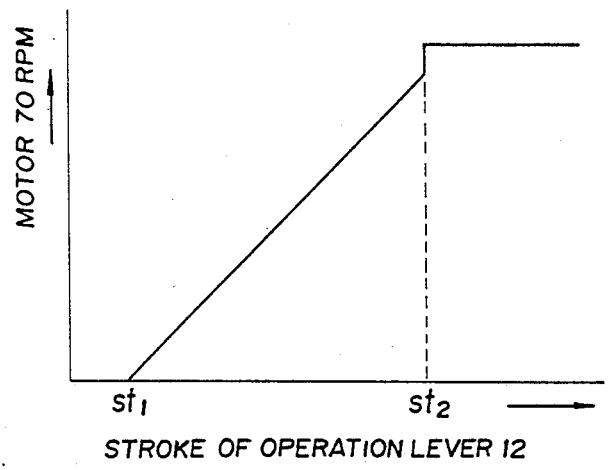
FIG. 6 is a graph for illustrating the rotational speed of a DC motor controlled by said preferred embodiment control switch, which is shown along the vertical axis, against the stroke of an operation lever of said control switch which is shown along the horizontal axis.

The comparator 83 compares the pulse width control signal "a" produced by the triangular wave generator 82 with the rotational speed setting signal "b" produced by the variable reference signal generator 84 and, for example, generates the speed variation control signals "C1", "C2", and "C3" as shown in FIG. 5. The output stage of this comparator 83 is connected to the base of the power transistor 14 via a switching circuit 85, which controls the electrical current supplied to the motor main circuit 86 by way of the power transistor 14, according to the output of the comparator 83 or the speed variation control signals "C1", "C2", and "C3". As can be seen from FIG. 5, when the operation stroke of the operation lever 12 is relatively small and the speed variation control signal C1 is produced, electrical voltage of a certain relatively high level is supplied to the base of the power transistor 14 for a time interval t1, so as to supply electric current to the main circuit for said time interval t1; and when the operation stroke of said operation lever 12 is intermediate and the speed variation control signal C2 is produced, electrical voltage of a certain intermediate level is supplied to the base of the power transistor 14 for a time interval t2 which is longer than the time interval t1, so as to supply electric current to the main circuit for said longer time interval t2; and, when the operation stroke of said operation lever 12 is relatively large and the speed variation control signal C3 is produced, electrical voltage of a certain relatively low level is supplied to the base of the power transistor 14 for a time interval t3 which is again longer than the time interval t2 and a fortiori is longer than the time interval t1, so as to supply electrical current to the main circuit for said yet longer time interval t3. In other words, as the operation lever 12 is depressed so as to turn on the second movable contact member 21 and the operation stroke thereof is increased from a relatively small value st1 to a relatively large value st2, as shown in FIG. 6 the time interval of supplying of electrical current to the main circuit 86 is increased from t1 to t2 and then to t3 in such a manner that the rotational speed of the motor 70 is caused to be substantially proportional to the operation stroke of the operation lever 12. The stroke st2 as shown by the broken line in FIG. 6 shows the time point at which the third movable contact member 22 becomes turned ON, and, since there now at this time and henceforward is caused no loss due to the internal resistance of the power transistor 14, from this point onwards as the operation lever 12 is further squeezed the motor 70 will rotate at its full speed by elimination of this resistance loss.

Thus, by adjusting the depression stroke of the operation lever 12 according to the circumstances of operation of the electric tool, the ON/OFF control and the torque adjustment of the motor 70 can be accomplished at the same time, and when the motor 70 is ON the electrical tool can be started at an arbitrary torque output, while when the motor 70 is turned OFF the rotation of the motor 70 is quickly stopped, so that, in fine, an electric tool of high usability can be realized.

Further, irrespective of the rotational direction of the motor 70, for instance a positive power supply is provided from the speed variation control circuit 94 to the primary end of the motor 70. In other words, when the motor 70 is rotating in the normal direction, the positive control power source is supplied to the speed variation control circuit 94 by way of the control power source line 90 and the diode 92; while, on the other hand, when the motor 70 is rotating in the reverse direction, the positive control power source is supplied to the speed variation control circuit 94 by way of the control power source line 91 and the diode 93. Thus, the need for circuitry for reversing the polarity of the signal is eliminated, and the structure is thereby simplified. This aspect makes this control circuit for a DC motor of the present invention particularly applicable to use in an electric tool which is required to be compact.

It is optional to add diodes to the FIG. 4 circuit for preventing unfavorable reverse flow of electrical current.

Conclusion

As mentioned above, since in soldering various ones of the terminals during the course of assembly of this switch, the soldering work is performed externally of the switch case 13, the work involved is simplified, and the efficiency of said work is thereby enhanced. In particular, since the terminals 25 of the power transistor 14 are soldered after they are engaged to the transistor terminal receiving holes 53 of the second power source terminal member 48, the second motor terminal member 50, and the circuit connection terminal member 51 (i.e. to the terminals of the switching mechanism), which project outwardly from the switch case 13, not only is the soldering work facilitated but also the mechanical strength of said connections is increased.

Thus, since the terminals of the power transistor 14 and the terminals of the switching mechanism are mutually connected together externally of the switch case 13 without the intervention of the printed circuit board 17 between them, the output pattern on the printed circuit board 17 can be reduced in size, and thereby the printed circuit board 17 itself can be made smaller. This contributes to compact design of the switch as a whole, and to the reduction of manufacturing cost through the simplification of assembly work.

Further, since a certain triangular wave signal is continuously derived from the triangular wave generator 82 and a voltage which is proportional to the operational stroke of the operation lever 12 is obtained from the variable reference signal generator 84, by comparing these two voltages, the speed variation control signals such as "C1", "C2", and "C3" shown in FIG. 5, which are proportional to said operational stroke of said operation lever 12, are obtained from the comparator 83. Thus, the supply of electrical current to the motor main circuit 86 is controlled so as to be proportional to the operational stroke of said operation lever 12 by way of the switching circuit 85, and a rotational speed of said motor 70 which is substantially proportional to said operational stroke of said operation lever 12 can be obtained with a very simple yet distinguished circuit structure. Therefore, the present invention, when applied as in the shown example to an electric tool, can achieve a great improvement in usability.

However, the control circuit for a DC motor of the present invention could also be applied to various other electrically controlled devices other than an electric tool, and also a FET or some other similar type of semiconductor switching device could be used in place of the power transistor 14. Other variations could be conceived of. Therefore, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. A variable speed control switch for an electric tool including a DC motor having an armature circuit, comprising:
    a means for turning off and on the armature circuit of said DC motor;
    an upper heat dissipation cover which covers a top surface of said turning off and on means;
    a lower heat dissipation cover which covers a bottom surface of said turning off and on means;
    a printed circuit board located on a lower surface of said lower heat dissipation cover and carrying a control circuit imprinted on it;
    a resistor element provided on the lower surface of said printed circuit board and constituting a part of a speed variation control circuit for said DC motor;
    a movable contact assembly, comprising a first contact member for short circuiting terminals of said DC motor, a second contact member for turning ON a power source, a third contact member for short circuiting said turning off and on means, and a brush for varying a resistive value by sliding over said resistor element;
    a means for biasing the movable contact assembly to a position which short circuiting the terminal of said DC motor;
    a box like casing which receives the above mentioned components in its upper opening, which further receives on one of its sides the power source terminals and a motor terminal, and provides on its lower side a depending support portion; and
    an operation lever which is drivingly engaged to said movable contact assembly at the upper portion thereof and pivoted said depending support portion of casing at the lower pivoted portion thereof, thereby adapted to operatively rock about its pivoted portion.

2. A variable speed control switch for an electric tool including a DC motor according to claim 1, wherein said movable contact assembly is formed with two mutually parallel ridges aligned along its direction of motion, said second contact member and said third contact member are generally formed in letter "U" shapes and are fitted over each of said two ridges; said first contact member being fitted into a hole formed in an otherwise unused space at end portions of said two ridges and generally perpendicular to said two ridges.

3. A variable speed control switch for an electric tool including a DC motor according to claim 1, further comprising a sealing cover fitted between said operation lever and said casing and permitting the motion of said operation lever with respect to said casing while providing a seal therebetween.

4. A variable speed control switch for an electric tool including a DC motor according to claim 1, wherein said resistor element is integrally provided in said printed circuit board.

5. A variable speed control switch for an electric tool including a DC motor according to claim 1, wherein said upper heat dissipation cover and said lower heat dissipation cover tightly receive said turning off and on means, and having main portion and extended portions, said extended portions perpendicular to said main portion and surrounding the sides of said turning off and on means.

6. A variable speed control switch for an electric tool including a DC motor according to claim 1, wherein at least one terminal of said turning off and on means and at least one of said contact members are connected together external to said casing.

* * * * *